United States Patent [19]

Gilb

[11] 4,423,977
[45] Jan. 3, 1984

[54] SINGLE ELEMENT SLOPE AND SKEW HANGER

[75] Inventor: Tyrell T. Gilb, Berkeley, Calif.

[73] Assignee: Simpson Strong-Tie Company, Inc., San Leandro, Calif.

[21] Appl. No.: 360,313

[22] Filed: Mar. 22, 1982

[51] Int. Cl.³ .......................... B25G 3/00; F16B 7/08; F16B 9/00
[52] U.S. Cl. .................................. 403/232.1; 52/702
[58] Field of Search ................ 403/232.1, 14; 52/289, 52/702, 712, 713, 715

[56] References Cited

U.S. PATENT DOCUMENTS

| 508,280 | 11/1893 | Cavallaro | 52/702 |
|---|---|---|---|
| 753,053 | 2/1904 | Eberhardt | 403/190 |
| 2,990,590 | 7/1961 | Graveley | 20/94 |
| 3,423,898 | 1/1969 | Tracy | 287/20.94 |
| 3,481,635 | 12/1969 | Tracy | 287/20.94 |
| 3,596,941 | 8/1971 | Tracy | 287/20.94 |
| 4,144,683 | 3/1979 | Dean | 52/182 |
| 4,158,940 | 6/1979 | Lancelot | 52/702 |
| 4,230,416 | 10/1980 | Gilb | 403/232.1 |
| 4,261,155 | 4/1981 | Gilb | 52/702 |
| 4,291,996 | 9/1981 | Gilb | 403/14 |
| 4,353,664 | 10/1982 | Gilb | 403/232.1 |

FOREIGN PATENT DOCUMENTS 2744523 4/1978 Fed. Rep. of Germany ... 403/232.1

Primary Examiner—Wayne L. Shedd
Attorney, Agent, or Firm—James R. Cypher

[57] ABSTRACT

A one piece connector for attaching a supported member such as a wood joist or beam to a supporting member or header in a sloped and/or skewed relationship including a back plate, side support members for attachment to the supporting members, a seat for registration with the end of the supported member, seat sides attached to the lower position of the supported member and tab members attached to the upper end portions of the supported member at their side faces.

12 Claims, 12 Drawing Figures

SINGLE ELEMENT SLOPE AND SKEW HANGER

BACKGROUND OF THE INVENTION

In wood frame construction wherein a supported member such as a joist is attached to a supporting member such as a valley or ridge board in typical roof construction, a compound cut is required in the end of the supported member or custom fabricated hangers must be specifically designed for the slope and skew angles involved. A like condition exists in any framing situation of floors, roofs or other supported elements wherein the supported member is attached to the supporting member at other than a 90 degree orientation horizontal and/or vertical.

The problem of attaching sloped and/or skewed supported members is well known in the construction industry. Cavallaro, U.S. Ser. No. 508,280, Nov. 7, 1893 is an example of a multipiece welded hanger used for heavy beam girder structural steel connections.

(1) Sawn Timber Joists

Light gauge sheet metal joist hangers for sawn timber wood construction were developed very early in the metal fabrication industries but all mass produced hangers avoided sloped and/or skewed connections. See Eberhardt, U.S. Ser. No. 753,053, Feb. 23, 1904.

Graveley, U.S. Pat. No. 2,990,590, July 4, 1961 teaches a light metal connector for sloped connections, but there is no provision for skewed connections. The saddle type connector provides only a metal edge seat which would be unsuitable for most applications. Graveley teaches a special connection for awning rafters which has not found general acceptance in the construction industry.

Tracy, U.S. Pat. No. 3,423,898, Jan. 28, 1969 teaches a roof framing system using various sheet metal connectors. While some of the connectors may receive sloped and/or skewed carried members none of them can be attached to the vertical face of the carrying member. All of the Tracy hangers are connected to and supported by the top face of the supporting members. Further, it is obvious that the fully encapsulating and overlapping construction of the devices would be relatively heavy and expensive. Because of the multitude of bends and heavy construction, field bending appears to be virtually impossible.

Tracy, U.S. Pat. No. 3,481,635, Dec. 2, 1969 is a more simplified attempt to achieve skewed and/or sloped connectors but was achieved at the expense of eliminating all seat support. Like the previous Tracy connector, connection to the face of the supporting member is impossible. This hanger is still relatively heavy and extremely inefficient since most of the side area has no load holding function and merely serves as a large area to provide multiple nail openings to accomodate various slope angles of the supported beam.

Tracy, U.S. Pat. No. 3,596,941, Aug. 3, 1971, is yet another example of a sloped and/or skewed connector. No seat is provided in the connector and like the previous Tracy connectors, the device is unsuitable for applications which require connection to the vertical face of the supporting member. The connector is relatively heavy providing excess non-load supporting sides which only serve to provide area to receive multiple nail openings.

Dean, U.S. Pat. No. 4,144,683, Mar. 20, 1979 teaches a bracket assembly for supporting downwardly sloping stairway stringers. Each bracket consists of two separate parts joined by a bolt. The bracket requires assembly of the apparatus on the job site and would not be cost effective to manufacture or assemble.

Lancelot, U.S. Pat. No. 4,158,940, June 26, 1979, teaches a hanger which will provide connection for skewed joists, but connection is only to the top of the supporting member, the device has multiple parts and will not accept sloped supported members. The device is far too expensive for most applications.

Gilb, U.S. Pat. No. 4,230,416, Oct. 28, 1980, provides a skewed connector which will not accept sloped supported members. The hanger is factory ordered as either a skewed left or skewed right device. Field bending is very limited.

Gilb, U.S. Pat. No. 4,261,155, Apr. 14, 1981, is one of the most innovative infinite skewed hangers on the market today. The hanger will also provide sloped connections but cannot be manufactured from a single sheet. Where a full seat is required, still another part must be attached to the device. Since the Gilb infinite skewed hanger cannot be manufactured from one piece of metal and fabricated by straightforward punch press operations, its cost is market limiting.

In addition to the hangers set forth in the patents discussed above, slope seat hangers are provided by the connector industry by three general methods: (1) weld-in seats. A seat is welded at the desired angle to the hanger stirrup sides. Such hangers are costly and cannot be used on light gauge metal due to welding limitations.

(2) Various "cookie-cut" methods wherein the stirrup and seat elements, in the flat blank condition, are cut to the particular pattern required so that upon bending the stirrup legs in respect to the seat the final configuration provides a sloped seat. Such hangers are expensive because for each slope increment, up or down, a different flat pattern is required. (3) Infinite-curve radius blanks. This method uses a constant section strip for the stirrups and seat. By bending it longitudinally at the center, a type of blank is thus made that can be bent so as to provide a sloped seat. This hanger is expensive because each hanger must be "custom" made with a different band radius length for each slope increment. Although slightly less expensive than "cookie-cut" types, it is not as precise a finished product.

A general objection to all of the above hangers is that they presently cost between four and six times more than a standard equivalent non-sloped hanger.

(2) Prefabricated Laminated Veneer Wood Joists (MICRO=LAM and Polywood Web I Beams)

Prefabricated wood joists such as the "I" type, produced by Trus Joist Corporation, using MICRO=-LAM top and bottom chords joined by a microlam web or polywood web I beams having sawn wood chords joined by a plywood web require a seat support for sloped conditions. The microlam or plywood web element in such joists is not continuous. When the butt joint between the plywood web sections occurs at or near the hanger, the stiffeners used to transmit the load between the joist web and the side wall of the non-seat type hangers, when on a slope, transmits excess tension pull to the plywood butt joints.

A further problem related to "I" type MICRO=-LAM joists, unlike sawn timber joists or the plywood web I beams with sawn timber chords is that the bottom chord element cannot be notched due to the fact that it is the tension member. Sawn timber joists on the other hand may be notched to accomodate a sloped condition, thus permitting the frequent use of standard hangers.

SUMMARY OF THE INVENTION

The key breakthrough in the present invention is the elimination of the continuous hanger sidewall which is present in every stirrup type hanger. A brief review of all of the prior art known to Applicant reveals that in order to achieve slope and/or skew capability all of the workers in the prior art, including Applicant increased the sidewall dimensions of the hanger. Eliminating the continuous sidewall is indeed a radical departure from accepted theory.

The seat element of the present invention even without stirrups remarkably provide the primary support at any reasonable slope angle of the supported member in respect to the supporting member by the following means. (1) The seat element is an integral part of the back plate of the hanger; connected thereto at the bottom along a bend line. (2) The seat element has sufficient length and upturned sides to accomplish the load reactions.

The connector herein described may be fabricated by straightforward punch press operations, using one piece of metal, and for a small fraction of the cost of most previous designs. Further, the same hanger design may be bent along only three bend lines to provide slope and/or skew for any reasonable skew or slope condition.

The connector of the present invention is of symmetrical design wherein the hinge bend line in the side mount elements is parallel to each vertical edge of the supported member providing maximum hanger strength.

The connector has a continuous back plate.

The present hanger is equally adept for use with prefabricated microlam joists as it is with sawn timber joists.

BRIEF DESCRIPTION OF THE DRAWINGS

FIG. 12 is a top plan view of the connector of the present invention illustrated in the unformed condition.

BRIEF DESCRIPTION OF THE PREFERRED EMBODIMENT OF THE INVENTION

Figure 2:
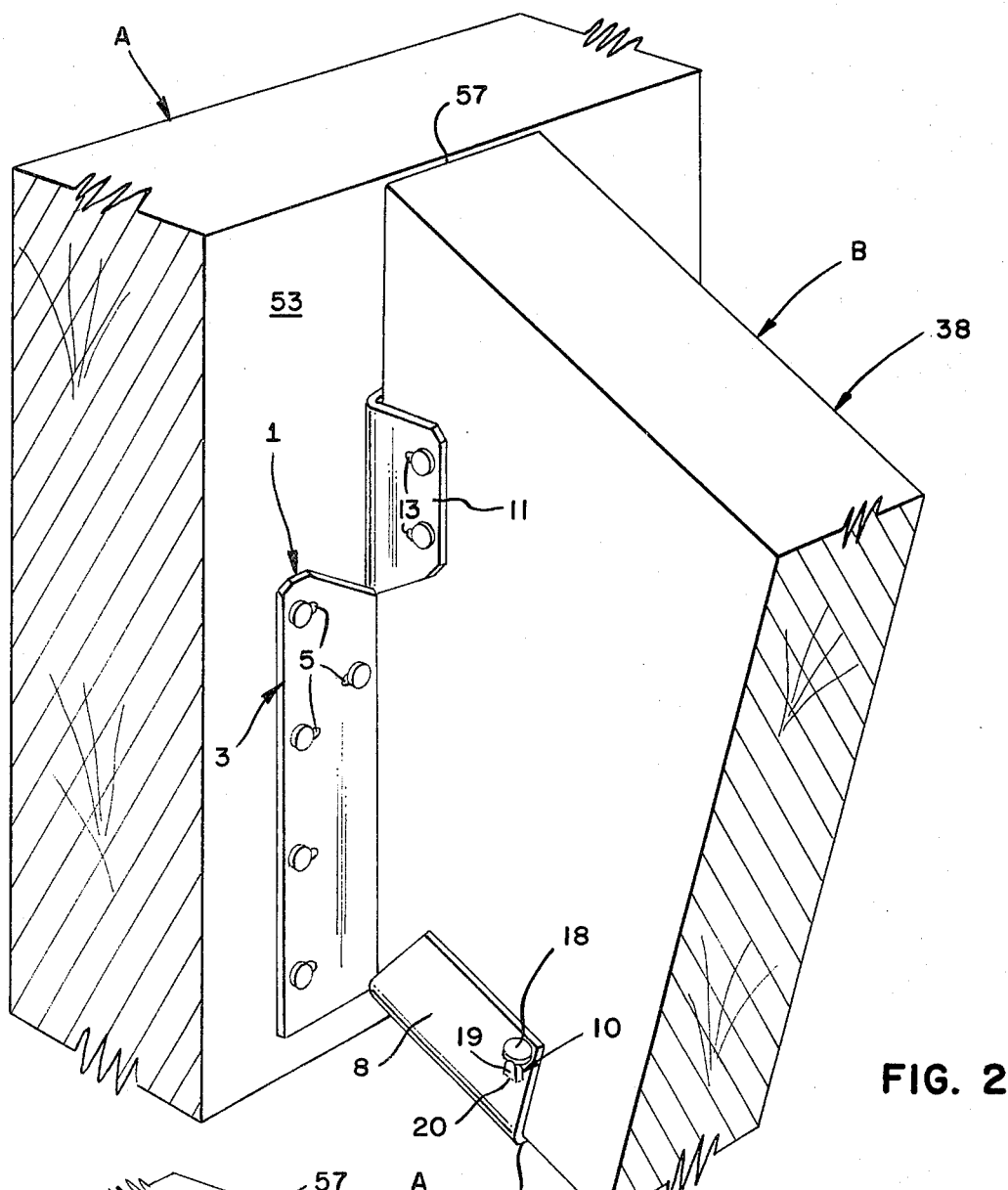
FIG. 2 is a perspective drawing of the connector of the present invention holding the supported member (solid sawn lumber) in a downwardly sloped position and connecting the supported member to a supporting member in a 90 degree relationship.
Figure 1:
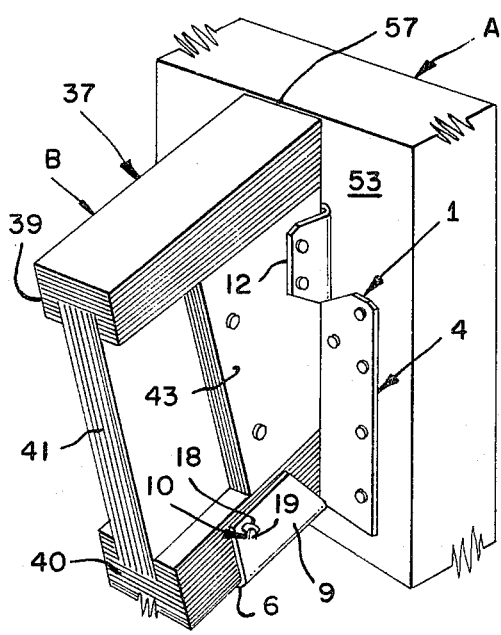
FIG. 1 is a perspective drawing of the connector of the present invention holding the supported member (a MICRO LAM laminated veneer "I" beam in a downwardly sloped position and connecting the supported member to a supporting member in a 90 degree relationship. Plywood web I beams are not shown and differ from the laminated Veneer "I" beam shown in that the top and bottom chord elements are usually sawn 2×4's and the web element is constructed from plywood.
Figure 3:
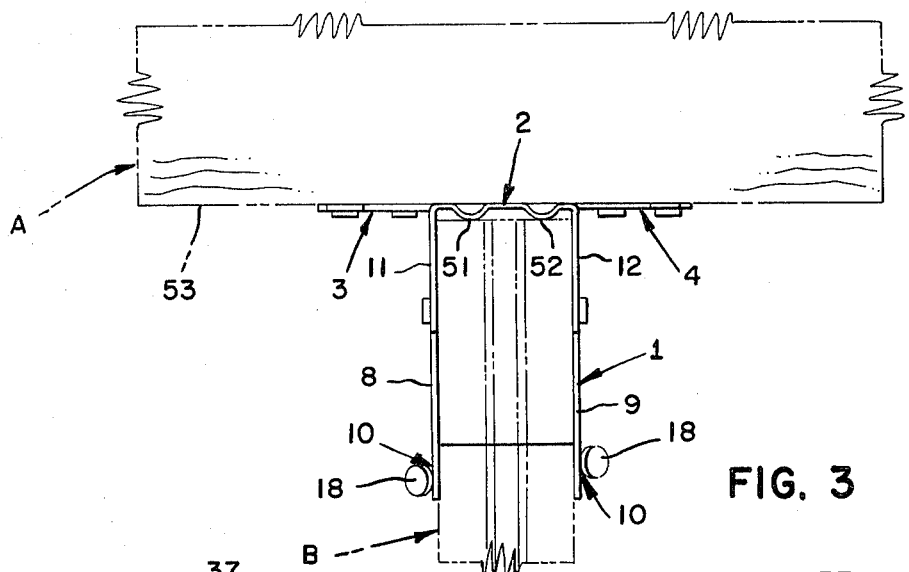
FIG. 3 is a top plan view of the connector and timber members shown in FIG. 1.
Figure 4:
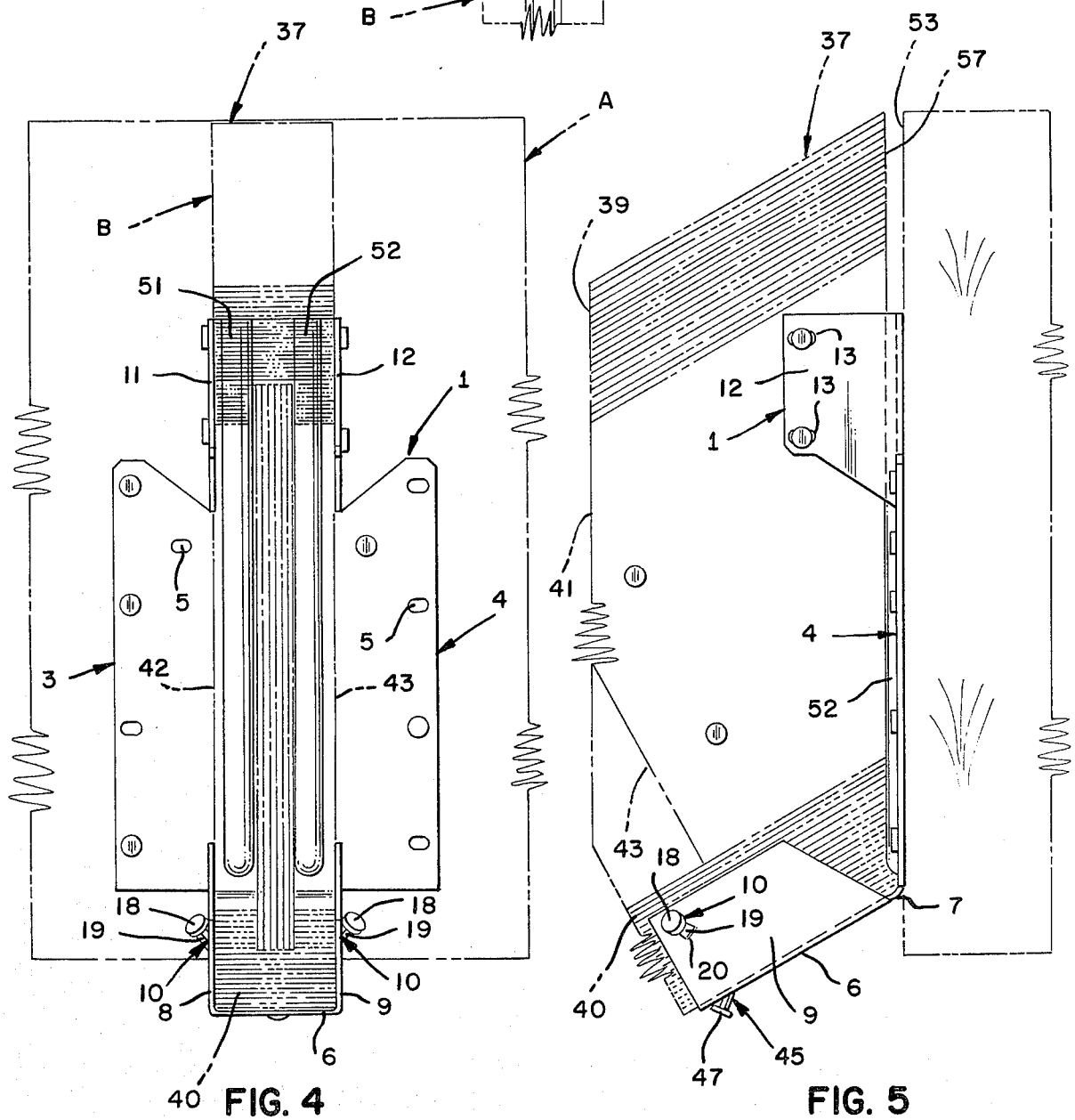
FIG. 4 is a front elevation view of the connector and timber members shown in FIG. 1.
Figure 5:
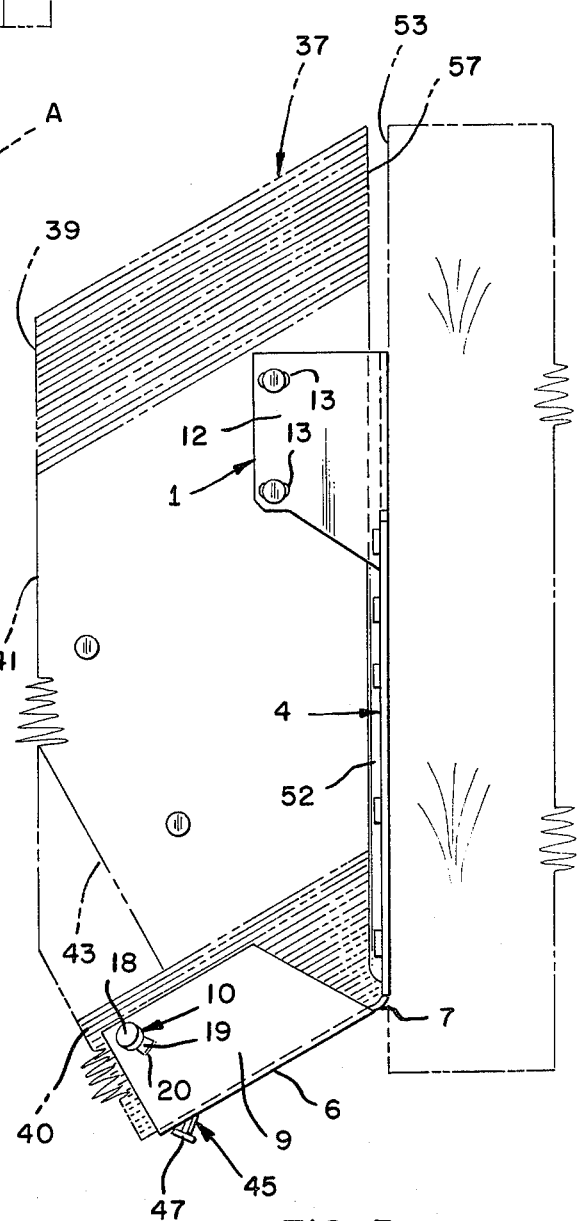
FIG. 5 is a side elevation view of the connector and timber members shown in FIG. 1.

The connector 1 of the present invention is designed to attach a wood supported member B to a wood supporting member A and consists briefly of a back plate 2; side support members 3 and 4 integrally attached to the opposite sides of the back plate and formed with a plurality of fastener openings 5; a seat base 6 integrally connected to the back plate along a seat bend line 7 and extending angularly therefrom a selected distance; a pair of seat sides 8 and 9 integrally connected to opposite sides of the seat base and extending genrally parallel to each other and angularly to the seat base and each formed with fastener openings at a selected distance from the seat bend line and from the seat base; and a pair of tab members 11 and 12 integrally connected to opposite sides of the back plate and extending generally parallel to each other and angularly to the seat base and each formed with fastener openings 13.

Figure 6:
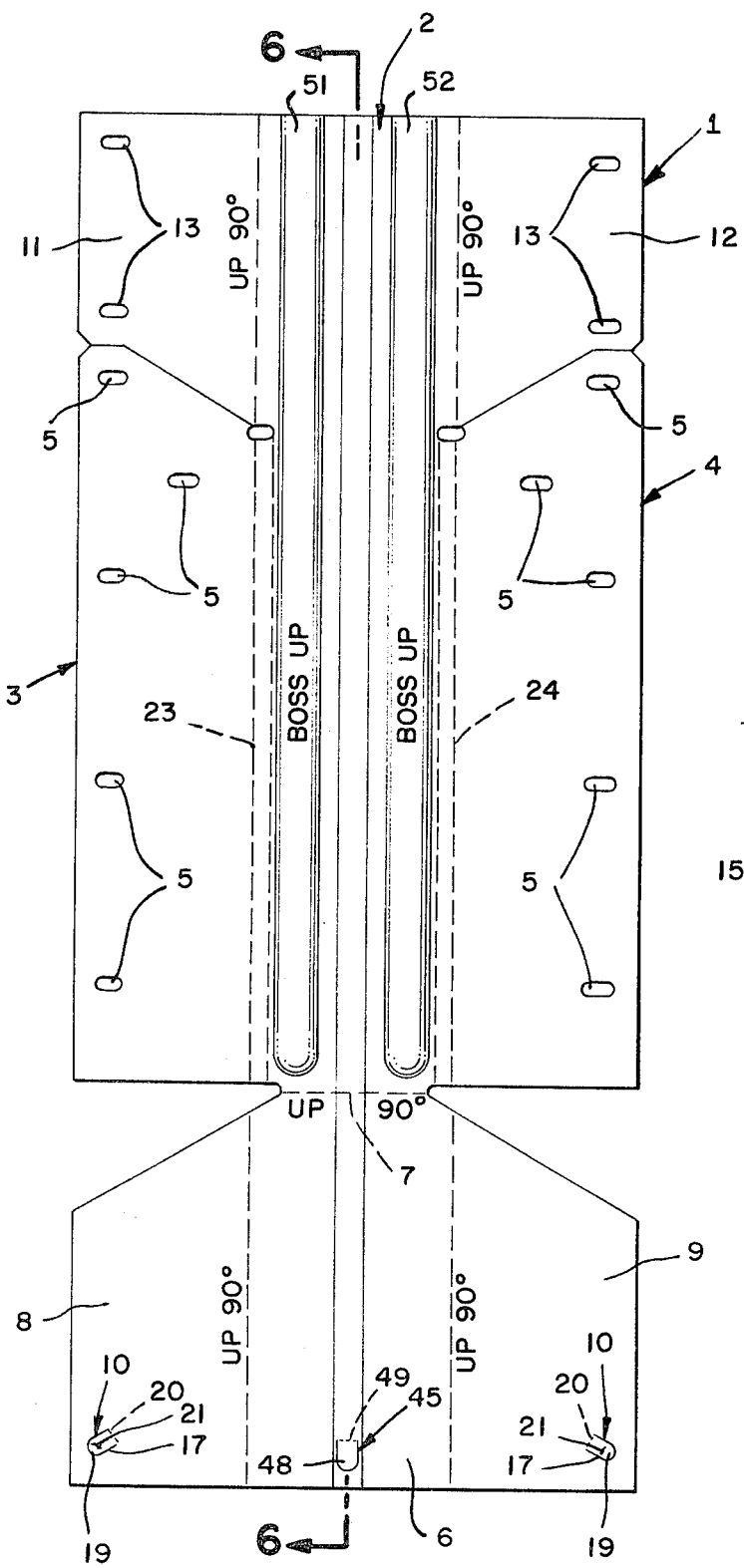
FIG. 6 is a cross sectional view of the connector taken along line 6—6 of FIG. 12 showing the connector in a formed condition for receipt of a supported member at a 90 degree angle to the supporting member. The broken lines show the location of the seat in the upwardly sloped and downwardly sloped positions.
Figure 6:
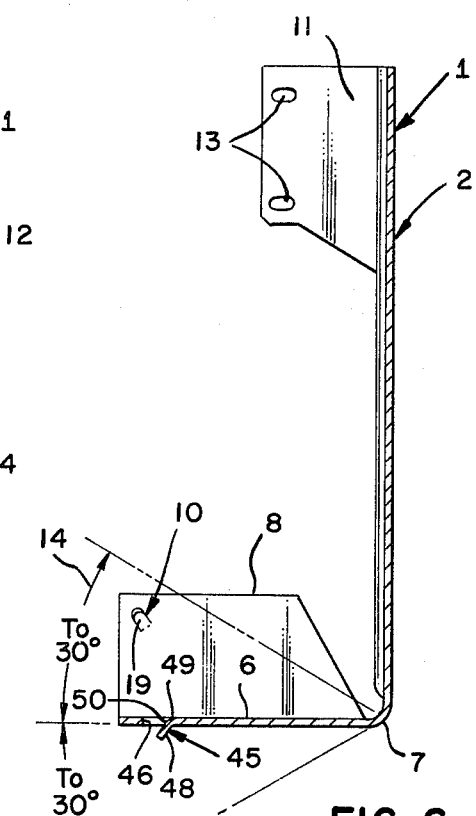
Figure 7:
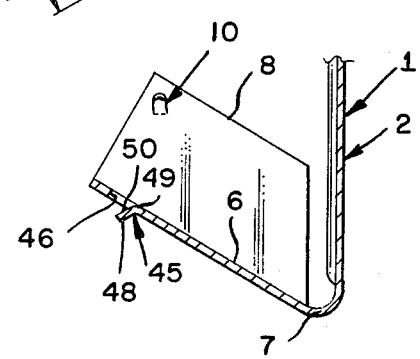
FIG. 7 is a partial cross sectional view of the connector illustrated in FIG. 6 showing the seat in the upwardly sloped position.
Figure 8:
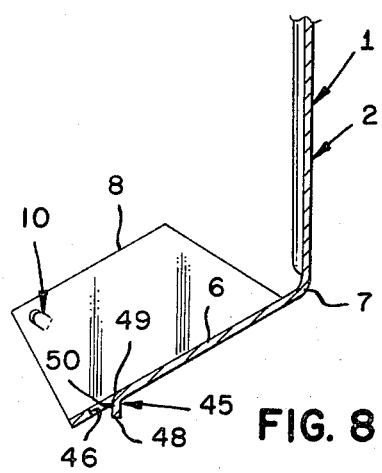
FIG. 8 is a partial cross sectional view of the connector illustrated in FIG. 6 showing the seat in the downwardly sloped position.

As illustrated in FIGS. 7 and 8, the seat base 6 and back plate 2 may form an angle of less than 90 degrees at their juncture at the seat bend line 7. In practice, as illustrated in FIG. 6 the upward bend angle as shown by double arrow line 14 may vary from a fraction of a degree up to any angle, although a manufacture's suggested angle is about 30 degrees. The downward position is illustrated in FIGS. 6 and 8 where the downward bend angle may be any value but, again as illustrated by double arrows 15 may vary as a practical matter from a fraction of a degree to about 30 degrees.

Where the connector is used to support sawn timber members, or plywood I beams the openings indicated by the number 10 may be circular in shape. It is preferable, however, to construct the openings in the manner described in Gilb, U.S. Pat. No. 4,291,996, Sept. 29, 1981 to prevent beam splitting and possible failure due to a condition known as "beam hanging". Where the connector is used to support glulam beams or MICRO-LAM laminated veneer lumber it is essential to construct the fastener openings as taught by Gilb, U.S. Pat. No. 4,291,996 supra. Referring to FIG. 12, the fastener openings 10 briefly described consist of slot-like openings 17 having a length greater than its width in which the width is selected to register with the side of the fastener such as nails 18. A tab-like member 19 is formed from the displaced face material from the slot-like opening and bent along a bend line 20 which constitutes one end of the slot-like opening. The tab-like member is formed with a nail receiving surface 21 for positively receiving a side of the nail in generally parallel, face to face relationship. The length of the slot-like opening is selected to receive the nail only at a pre-selected angle in relation to the seat side so that one side of the shank of the nail is in touching or close fitting relation to one end of the slot-like opening and the opposite side of the nail shank is in touching or close fitting relation to the receiving surface of the tab-like member.

Figure 9:
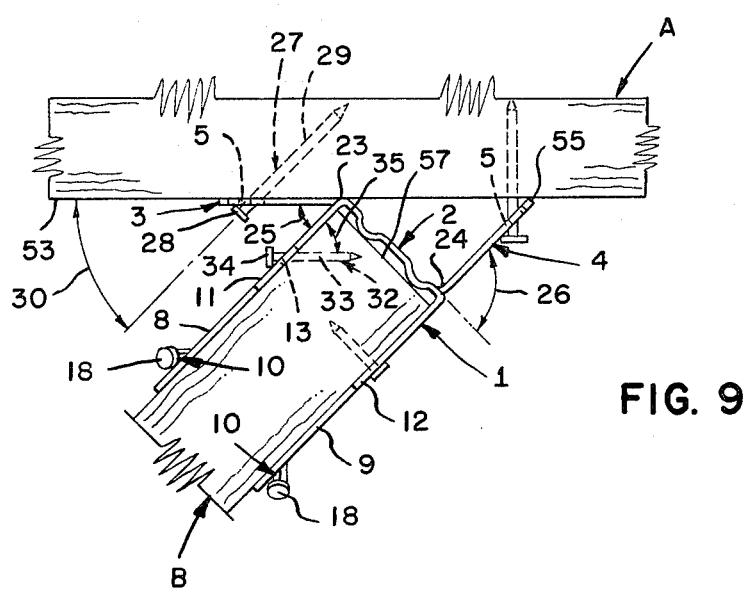
FIG. 9 is a top plan view of the connector and timber members shown in FIG. 1 but with the connector formed to hold the supported member at an angle with respect to the supporting member.
Figure 10:
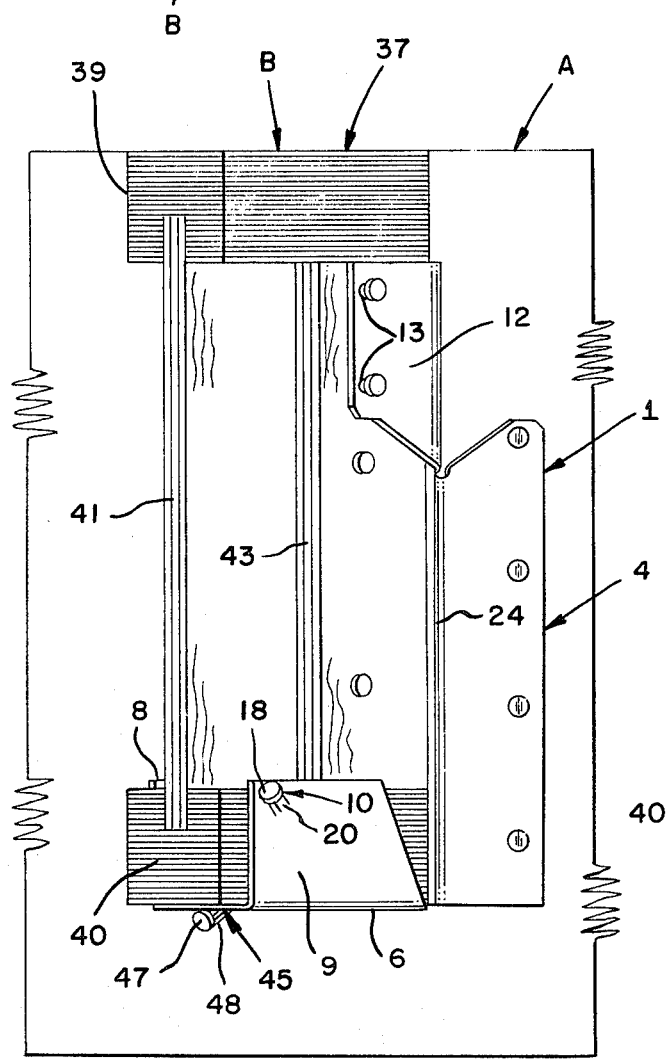
FIG. 10 is a front elevation view of the connector and timber members shown in FIG. 9.
Figure 11:
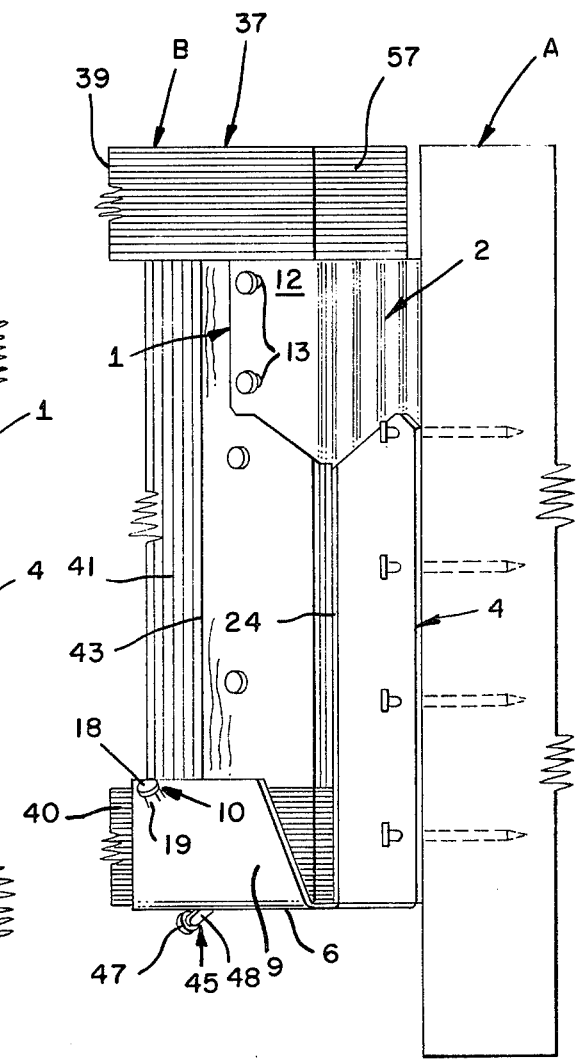
FIG. 11 is a side elevation view of the connector and timber members illustrated in FIG. 9.

Referring to FIGS. 9-11, the connector 1 may be formed with longitudinally extending bend lines 23 and 24 located between each of the side support members 3 and 4 and the back plate 2. The bend lines permit angular displacement of the side support members 3 and 4 for skewed attachment of the supported member B relative to the supporting member A. As illustrated in FIG. 9, side support member 3 is bent at an acute angle respresented by the double arrow line 25 and side support member 4 is bent at an angle represented by the double arrow 26.

Fastener openings 5 in side support members 3 and 4 could be circular in shape where the connector is to be used for carrying supported members B at a 90 degree angle, or at only a relatively slight skew angle. Where, however, the connector is to be used for attaching wood members at a substantial skew angle, it is necessary to either extend one of the side support members substantially or form the fastener openings as fully described in Gilb, U.S. Pat. No. 4,230,416, supra. The preferred method of forming the openings is, of course as set forth in U.S. Pat. No. 4,230,416 supra and briefly set forth as follows.

As best illustrated in FIG. 9, it would be impossible to drive fastener 27 perpendicular to supporting member A due to the restriction of supported member B positioned at a skewed angle. The fastener openings in at least one of the side support members, and preferably both, are formed with restricted slot openings 5 therethrough. A first nail fastener 27 having a shank with a uniform diameter and a head 28 with a diameter greater than th diameter of the shank 29 is driven into the supporting member A. The nail fastener 27 and the side support member 3 form a first selected angle represented by the double arrow 30. The first restricted slot openings are formed with a width slightly larger than the diameter of the first nail fastener and are formed with a length greater than the diameter of the first nail fastener so that when the first nail fastener is inserted through the first restricted slot opening at the first selected angle the diagonally opposed outer edges of the sides of the first restricted slot opening tangentially register with opposed sides of the first nail fastener and relative movement between the first nail fastener and the connector is prevented.

Fastener openings 13 in tab members 11 and 12 could be circular in shape where the connector is to be used for carrying supported members B at a 90 degree angle or at only a relatively slight skew angle. Where, however, the connector is to be used for attaching wood members at a substantial skew angle, it is necessary to either extend one of the tab members substantially or form the fastener openings as fully described in Gilb, U.S. Pat. No. 4,230,416, supra. The preferred method of forming the openings is, again, set forth in U.S. Pat. No. 4,230,416 supra and briefly set forth as follows.

Turning once again to FIG. 9, it would be impossible to drive second nail fastener 32 perpendicular to supported member B due to the restriction of supporting member A positioned at a skewed angle as represented by double arrow 25. The fastener openings in at least one of the tab members 11 or 12, and preferably both, are formed with restricted slot openings 13 therethrough. Second nail fastener 32 has a shank 33 with a uniform diameter and a head 34 with a diameter greater than the diameter of the shank. The second nail fastener 32 and tab member 11 form a second selected angle represented by the double arrow 35. The second restricted slot opening 13 is formed with a width slightly larger than the diameter of the second nail fastener 33 and is formed with a length greater than the diameter of the second nail so that when the second nail is inserted through the second restricted slot opening at the second selected angle the diagonally opposed outer edges of the sides of the second restricted slot opening tangentially register with opposed sides of the second nail fastener.

Referring to FIGS. 6-9, it may be seen that the connector of the present invention may be used to connect a supported member B to a supporting member A with the supported member being both sloped (up or down) and skewed (either right or left) at the same time. FIG. 9 illustrates the connector skewed to the left, but a reversal of the direction of bending of side support members 3 and 4 along bend lines 23 and 24 creates a rightwardly skew with the same connector as formed from the blank illustrated in FIG. 12.

The ability to accomodate slope (up or down) while being skewed (right or left) is possible because only the side support members 3 and 4 are bent along bend lines 23 and 24 while both the tab members 11 an 12 as well as the seat side members 8 and 9 are always bent at 90 degree angles.

FIGS. 1, 3-5, and 9-11 illustrate a supported member B which is of a special laminated veneer construction and further designated by the number 37 to distinguish it from the sawn type solid timber shown in FIG. 2 and also further designated by the number 38.

The laminated veneer supported member 37 consists of laminations of plywood which make up a top chord 39 and a bottom chord 40, both of which are integrally adhered to a laminated plywood web 41. End stiffeners 42 and 43 are attached to the web 41 at both ends of the supported member 37 as by nailing.

The seat element provides the primary support at any reasonable slope angle of the supported member B in respect to the supporting member A. The seat element which includes the base and seat sides is formed with sufficient length and sides with sufficient height to accomplish the load reactions described below.

By convention and fact, the center point of seat load is assumed to occur at the midpoint between the attaching bend line and the end of the seat. This load, as a downward force, can be described as a rotating arm moment force with the bend line as the centerpoint thereof. Also, the distance between the centerpoint and the bend line may be assigned a force value of unity (1). In order to resist this dowward force, attaching means can be provided anywhere in the integral seat or side members and connected to the supported member. The value of these attachment points as load-supports in respect to the unity load (1) is equal to their specific value times the distance from the bend line as a ratio of the unity load (1) arm distance. The practical result of this means of load support is that there is a multiplication of the value of the attaching means proportional to their arm moment distance from the bend line in respect to the unity distance of the load center also considered as arm moment distance from the bend line.

The design assumed, and test data confirmed, that one-half the load distributes directly to the bend line connection. This assumption is entirely dependent upon the fact and functions of the attachments in the base sides. Without such attachments, load value would be only the nominal resistance to rebend at the bend line 7.

Fastener receiving openings in the seat sides have been previously described. Since the seat element is the primary support means, a fastener receiving means may be formed in the seat base to increase the load support. In the sawn lumber supported member shown in FIG. 2, the opening may be simply a round opening for receiving a nail. Where the supported member B is a laminated veneer beam 37 the fastener receiving means must be a positive angle nailing device as previously described to prevent splitting of the laminated web 41. Referring to FIGS. 6–8 and 10–12, the fastener receiving means 45 in the seat base includes a slot-like opening 46 having a length greater than its width wherein the width is selected to register with the side of the seat base nail 47. A tab-like member 48 is formed from the displaced face material from the slot-like opening and bent along a bend line 49 which constitutes one end of the slot-like opening. The tab-like member is formed with a nail receiving surface 50 for positively receiving a side of the seat base nail 47 in generally parallel, face to face relationship. The length of the slot-like opening is selected to receive the seat base nail at a pre-selected angle in relation to the seat base so that one side of the shank of the seat base nail is in touching or close fitting relation to one end of the slot-like opening and the opposite side of the nail shank is in touching or close fitting relation to the receiving surface of the tab-like member.

Surprisingly, the connector of the present invention when constructed as described and attached as described provided load capacities by test of approximately six times rated load capacities instead of the three times rated load capacity expected for arm moment only resistance to load.

A key feature of the connector is the fact that it has a continuous back plate 2. The back plate may be formed with at least one longitudinally extending embossment 51, and preferably a second longitudinally extending embossment 52; both extending substantially the entire length of the back plate. The stiffening embossments provide a stiffened transition between the back plate and the tab members 11 and 12.

OPERATION

When installing a supported member in a sloped relation to the supporting member, the end face 57 of the supported member must be cut at the slope angle so that it is parallel to the face 53 of the supporting member. The end face 57 of the supported member, whether the supported member is carried at a slope, a skew, horizontal or at a 90 degree angle to the supporting member is always cut at an angle 90 degrees with respect to the side of the supported member so that the end face 57 of the supported member is in flush abutment with the back plate 2.

Installation of the supported member in a horizontal or sloped position is identical to the installation of a supported member with a standard hanger. When, however, the connector is attached in a skewed position, the side support member (such as side support member 3 in FIG. 9) which remains flush with the face 53 of the supporting member A is first attached to the supporting member. Next, if not already pre-bent to the correct angle, the back plate is bent along the bend line 23 to an angle equal to the desired angle of skew such as shown by double arrows 25. The opposite side support member (member 4 in FIG. 9) is then bent in the opposite direction in respect to the back plate along bend line 24 to an angle (angle 26 in FIG. 9) required to make the outboard edge 55 touch the face 53 of the supporting member A. This operation may be accomplished in either direction for skew in either direction.

When the connector of the present invention is used with the lamininated veneer supported member previously described, the standard design is to dimension the height of the connector so that the nail openings 13 in the tab members 11 and 12 fall below the top chord member 39. This insures that no nails are driven into the top chord at a 90 degree angle and parallel to the laminations so as to split the top chord. Where special conditions subsist and it is necessary to drive nails into the top chord through openings in the tab members, special positive angle nailing fastener opening means must be used in the tab members 11 and 12 such as the fastener opening means 10 used in the seat sides.

I claim:

1. A sheetmetal slope and skew hanger connector in a frame building structure comprising:
    (a) a wood supporting member having a generally planar front face;
    (b) a wood supported member having a generally planar end face, generally planar side portions intersecting said end face, and a bottom edge face;
    (c) an elongated back plate member adapted for registration with said front face of said wood supporting member;
    (d) first and second side support members integrally attached to opposite sides of said back plate, formed with a plurality of fastener openings and adapted for connection to said face of said supporting member;
    (e) a seat base integrally connected to an end of said back plate along a seat bend line and extending angularly therefrom a selected distance and adapted for registration with said bottom edge face of said wood supported member;
    (f) a pair of seat sides integrally connected to opposite sides of said seat base and extending generally parallel to each other and angularly to said seat base and each formed with fastener openings at a selected distance from said seat bend line and from said seat base and adapted for connection to said side portions of said wood supported member; and
    (g) a pair of tab members spaced from said side support members and integrally connected to opposite sides of said back plate and extending generally parallel to each other and angularly to said seat base and each formed with fastener openings at selected distances from said back plate and adapted for connection to said side portions of said wood supported member.

2. A connector as described in claim 1 comprising:
    (a) said seat base and said back plate form an angle of less than 90 degrees at their juncture at said seat bend line.

3. A connector as described in claim 1 comprising:
    (a) said seat base and said back plate form an angle of more than 90 degrees at their juncture at said seat bend line.

4. A connector as described in claim 1 adapted for nail attachment wherein;
   (a) said fastener openings in said seat sides are formed with slot-like openings having first and second ends and having a length greater than their width and said sides of said openings register with the sides of said nails;
   (b) a tab-like member is formed from the displaced face material from said slot-like opening and extends at an angle to said said seat side along a bend line which constitutes said first end of said slot-like opening;
   (c) said tab-like member is formed with a nail receiving surface adapted for registration with a side of said nail in generally parallel, face to face relationship; and
   (d) said second end of said slot-like opening and said tab-like member hold said nail only at a pre-selected angle in relation to said seat side wherein one side of the shank of said nail is in touching and close fitting relation to said second end of said slot-like opening and the opposite side of said nail shank is in touching and close fitting relation to said receiving surface of said tab-like member.

5. A connector as described in claim 4 comprising:
   a. said seat base is formed with a fastener opening adapted for receiving a seat base nail fastener therethrough and into said supported member;
   b. said fastener opening in said seat base includes;
      (1) a slot-like opening having first and second ends and having a length greater than its width and said sides of said opening register with the sides of said seat base nail;
      (2) a tab-like member is formed from the displaced face material from said slot-like opening and extends at an angle to said seat base along a bend line which constitutes said first end of said slot-like opening;
      (3) said tab-like member is formed with a nail receiving surface adapted for registration with a side of said seat base nail in generally parallel, face to face relationship; and
      (4) said second end of said slot-like opening and said tab-like member hold said seat base nail at a pre-selected angle in relation to said seat base wherein one side of the shank of said seat base nail is in touching and close fitting relation to said second end of said slot-like opening and the opposite side of said nail shank is in touching and close fitting relation to said receiving surface of said tab-like member.

6. A connector as described in claim 1 wherein:
   (a) a longitudinally extending bend line is formed in said connector between each of said side support members and said back plate member and said first side support member forms a first angle with said back plate member and said second side support member forms a second angle with said back plate member and said supported member forms an acute angle relative to said supporting member.

7. A connector as described in claim 6 comprising:
   (a) said fastener openings in at least one of said side support members are formed with restricted slot openings therethrough;
   (b) a first nail fastener having a shank with a uniform diameter and a head having a diameter greater than the diameter of said shank adapted for being driven into said supporting member;
   (c) said first nail fastener and said side support member form a first selected angle; and
   (d) said first restricted slot opening is formed with a width slightly larger than the diameter of said first nail fastener and is formed with a length greater than the diameter of said first nail fastener wherein the diagonally opposed outer edges of the sides of said first restricted slot opening tangentially register with opposed sides of said first nail fastener and relative movement between said first nail fastener and said connector is prevented.

8. A connector as described in claim 7 comprising:
   a. said fastener openings in at least one of said tab members are formed with restricted slot openings therethrough;
   b. a second nail fastener having a shank with a uniform diameter and a head having a diameter greater than the diameter of said shank is adapted for being driven into said supported member;
   c. said second nail fastener and said tab member form a second selected angle; and
   d. said second restricted slot opening is formed with a width slightly larger than the diameter of said second nail fastener and is formed with a length greater than the diameter of said second nail and the diagonally opposed outer edges of the sides of said second slot opening tangentially register with opposed sides of said second fastener and relative movement between said nail fastener and said connector is prevented.

9. A connector as described in claim 2 comprising:
   (a) a longitudinally extending bend line is formed in said connector between each of said side support members and said back plate member and said first side support member forms a first angle with said back plate member and said second side support member forms a second angle with said back plate member and said supported member forms an acute angle relative to said supporting member.

10. A connector as described in claim 3 comprising:
    (a) a longitudinally extending bend line is formed in said connector between each of said side support members and said back plate member and said first side support member form a first angle with said back plate member and said second side support member forms a second angle with said back plate member and said supported member forms an acute angle relative to said supporting member.

11. A connector as described in claim 1 comprising:
    (a) a said back plate member is formed with at least one longitudinally extending embossment extending substantially the entire length of said back plate.

12. A connector as described in claim 5 comprising:
    (a) said fastener receiving opening in said seat base is located a substantial distance from said seat base bend line.

* * * * *